(No Model.)

L. NEWTON.
HARROW.

No. 342,031. Patented May 18, 1886.

Witnesses.
A. Ruppert.
J. W. Nye.

Inventor:
L. Newton,
Per
Thomas P. Simpson
Attorney

UNITED STATES PATENT OFFICE.

LUKENS NEWTON, OF CORTLAND, OHIO.

HARROW.

SPECIFICATION forming part of Letters Patent No. 342,031, dated May 18, 1886.

Application filed July 18, 1885. Serial No. 171,951. (No model.)

*To all whom it may concern:*

Be it known that I, LUKENS NEWTON, of Cortland, in the county of Trumbull and State of Ohio, have invented an Improved Harrow, of which the following is a specification.

The invention, generally, relates to that class of harrows in which the teeth are backwardly inclined, so as to avoid clogging, and make the teeth self-sharpening.

My special object is to arrange the teeth in successively-increasing sets transversely across the frame and toward the rear, so that the crust will be broken by degrees and the clods crushed between the sets by the pressure and friction of the solid frame.

Figure 1:
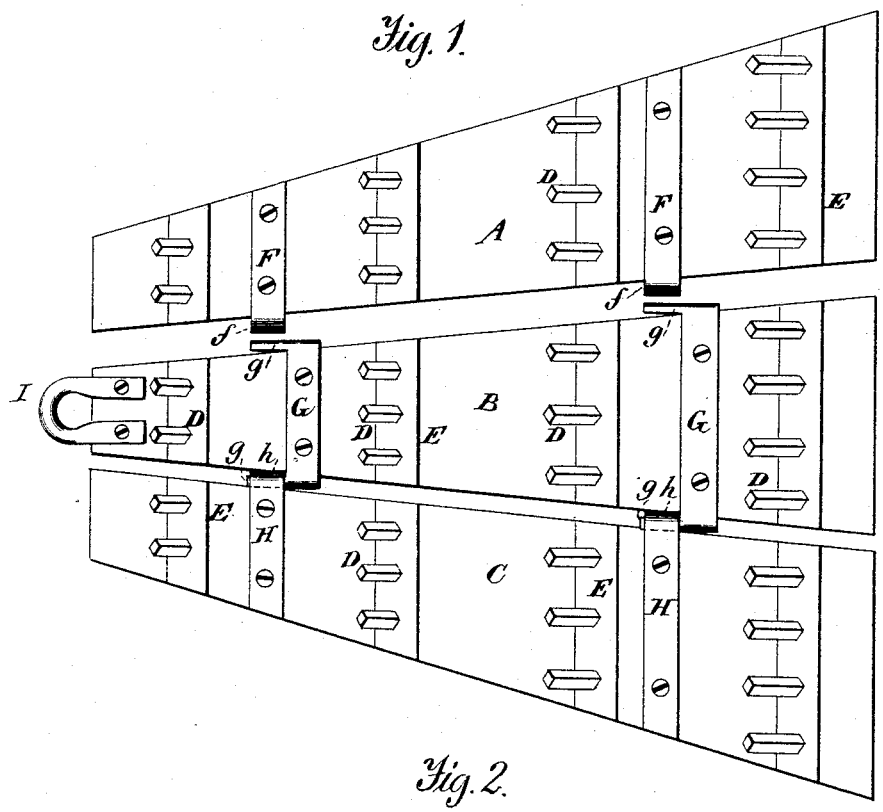
Figure 2:
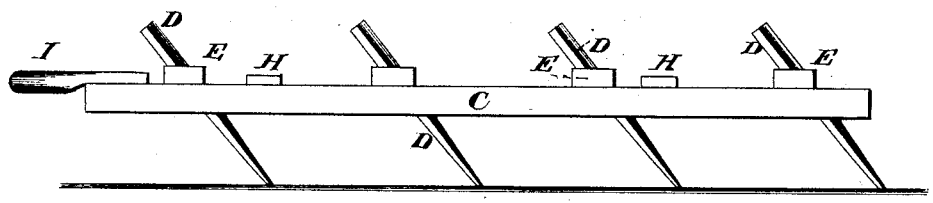
Figure 3:
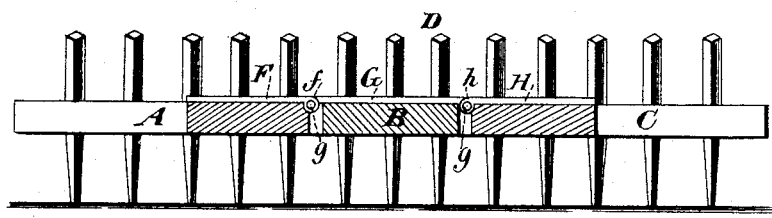

Figure 1 of the drawings is a plan view, showing the harrow-sections apart but in position to be readily jointed together. Fig. 2 is a side elevation, and Fig. 3 is a cross-sectional elevation through a row of teeth.

In the drawings, A B C represent the three sections of my harrow, each made of heavy plank, gradually increasing in width from front to rear, and provided with transverse rows of teeth backwardly inclined.

D are tapering teeth, which may be secured in oblique holes by driving them in from the top and through to the required distance, or they may be held by any of the usual and well-known devices. Where driven into position, I use auxiliary cross-straps E, so that the contraction and expansion of the wood of the straps being in a different direction from that of the section-planks, there will be little likelihood that the teeth will work loose.

F G H represent the metallic bands which hold the sections A B C together in such a manner that A or C may be lifted sidewise, or all may be lifted together by raising the middle section, B.

F H are eye-plates, and G a pintle-plate. The pintles *g g* are arranged on the front corner of each end of plate G, so that the eyes *f h* of the other plates may be slipped on from the front, be retained without any fastenings, so as to be readily separated when the harrow is not in use. This enables the harrow to be packed in small compass for transportation or in the tool-house.

I represents the draft-loop, which is made fast to the front end of the middle section, B. It will thus be perceived that the arrangement of teeth is such that all the ground will be deeply stirred, while the clods will be effectually rubbed and compressed by the heavy solid frame until they are pulverized. Indeed, ground over which my harrow has passed presents very much the appearance of land which has been harrowed, cross-harrowed, and rolled in the ordinary way. Moreover, the construction is so simple that it can be afforded to the public at a very moderate price, while it is strong, durable, and will be little liable to get out of order.

In the body of the harrow I use, preferably, two-inch plank, and may make it in a greater or less number of sections.

I am aware that harrows have increased in width from front to rear; that they have been made in sections, side-hinged, or pivoted together; that boards with very short teeth have been used to break clods, and that harrow-teeth have been backwardly inclined; hence, my invention is not a separate feature of novelty, but only the way of putting together old things to form a new entirety which will enable a farmer to cultivate, pulverize, and roll previously-plowed ground at one operation; hence,

What I claim is—

A combined harrow, pulverizer, and smoother, consisting of heavy plank, central and side sections jointed together, increasing in width from front to rear, and provided with transverse rows of backwardly-inclined teeth, as shown and described.

LUKENS NEWTON.

Witnesses:
    JACOB BUCHER,
    HOYT TRUMBULL.